United States Patent [19]
Soyland et al.

[11] 3,723,026
[45] Mar. 27, 1973

[54] EFFECT REGULATOR FOR CONSTANT AND VARIABLE VOLUME-FLOW PUMPS

[76] Inventors: Ingebret Soyland; Kristian Soyland, both of 4340 Bryne, Norway

[22] Filed: Apr. 9, 1971

[21] Appl. No.: 132,668

[30] Foreign Application Priority Data

Apr. 22, 1970 Norway .................................. 1551

[52] U.S. Cl. ..................... 417/286, 417/222, 417/216
[51] Int. Cl. ............................................ F04b 49/00
[58] Field of Search ...... 417/216, 426, 286, 287, 428; 137/99, 100

[56] References Cited

UNITED STATES PATENTS

| 2,280,392 | 4/1942 | Hermann | 417/428 |
|---|---|---|---|
| 2,655,109 | 10/1953 | Walker | 417/428 |
| 2,870,776 | 1/1959 | Marsh | 137/99 |
| 2,967,485 | 1/1961 | Towler et al. | 417/428 |
| 3,093,081 | 6/1963 | Bodzich | 417/216 |

FOREIGN PATENTS OR APPLICATIONS

| 1,528,476 | 8/1969 | Germany | 417/426 |
|---|---|---|---|
| 1,922,269 | 11/1970 | Germany | 417/216 |

*Primary Examiner*—William L. Freeh
*Attorney*—Holman & Stern

[57] ABSTRACT

Means for regulating the flow of fluid from two or more pumps in a hydraulic system, according to the instantaneous demand for energy.

5 Claims, 5 Drawing Figures

EFFECT REGULATOR FOR CONSTANT AND VARIABLE VOLUME-FLOW PUMPS

BACKGROUND OF THE INVENTION

The present invention relates to a simple effect regulator for regulating the total effect from a plurality of pressure medium flows, and which is capable of regulating the effect from both constant and variable volume-flow pumps.

PRIOR ART

Various types of effect regulators are known for regulating one or two variable volume-flow pumps. These regulators are relatively complex and require mechanical connection between the pumps. The known systems are therefore unsuitable for regulating more than two pumps at the same time.

OBJECTS AND SUMMARY OF THE INVENTION

The advantage of the present invention is the simple manner whereby the total effect of a plurality of circuits is summated. The summating unit is based on the pressure reduction valve principle whereby the reduced pressure registers at all times the total effect from all the volume-flow circuits. This regulating pressure or summating pressure is then utilized to give greater volume-flow from the pumps to be regulated. A wholly hydraulic regulating member is thus achieved without mechanical means.

A further advantage is that the summated pressure varies continuously and gives, at all times, a correct picture of the total effect from a plurality of pumps. The regulator is capable of summating the effect from an almost unrestricted number of pumps.

In addition to automatic regulation, the regulator also permits manual regulation of the pumps used.

These and other advantages would be clear from the further description where reference is made to the drawings, where:

DETAILED DESCRIPTION OF THE INVENTION

Figure 1:
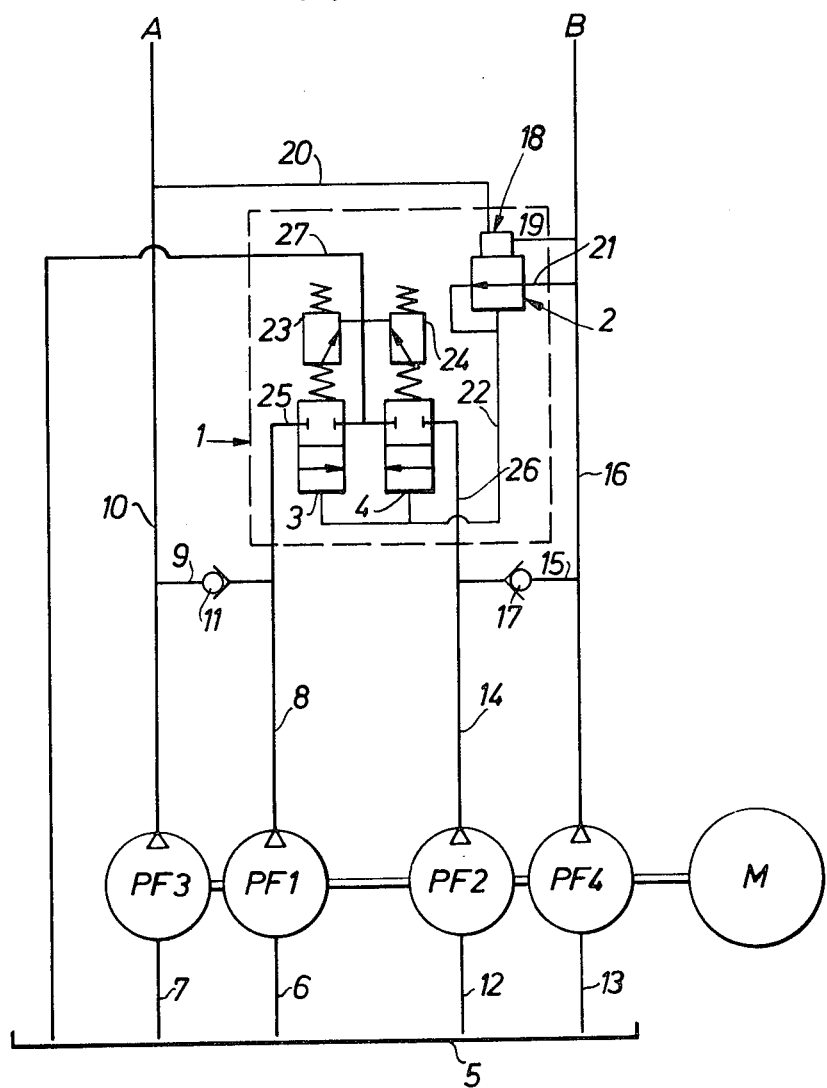
FIG. 1 shows a system in symbols with two separate volume-flow circuits with constant volume-flow pumps.

FIG. 1 shows an example of the invention used in a system where two separate volume-flow circuits supply effect to two independent consumers A and B. The actual consumers and the directional valves thereof are not shown, since they can be of known, conventional types. A motor M operates four separate constant volume-flow pump units which can be equal or different in the volume capacity thereof. The pump PF1 and PF3 deliver volume-flow to consumer A, and the pump PF2 and PF4 deliver volume-flow to the consumer B.

An effect regulator 1 consists of two main components, a summating unit 2 and regulating units 3 and 4. These components are described in more detail hereinafter with reference to FIG. 2.

The main circuit of the consumer A consists of suction conduits 6 and 7, and pressure conduits 8, 9, 10 and single-way valve 11. Similarly, the main circuit for the consumer B consists of suction conduits 12 and 13 and pressure conduits 14, 15, 16 and single-way valve 17. A summating head 18 is connected to the main conduits 10 and 16 via control conduits 19 and 20. The pressure medium is supplied to the summating unit 2 from the main conduit 16, optionally from main conduit 10, through conduit 21. The summating pressure from the summating unit 2 is supplied to the regulating unit 3 and 4 through conduit 22. The regulating units (the valves) are controlled by pilot valves 23 and 24. The regulating units 3 and 4 are connected to pressure conduit 8 and 14 from pump PF1 and PF2 through conduits 25 and 26. The return medium from the regulating units 3 and 4, and the pilots 23 and 24 is conveyed to the tank 5 through return conduit 27.

Figure 2:
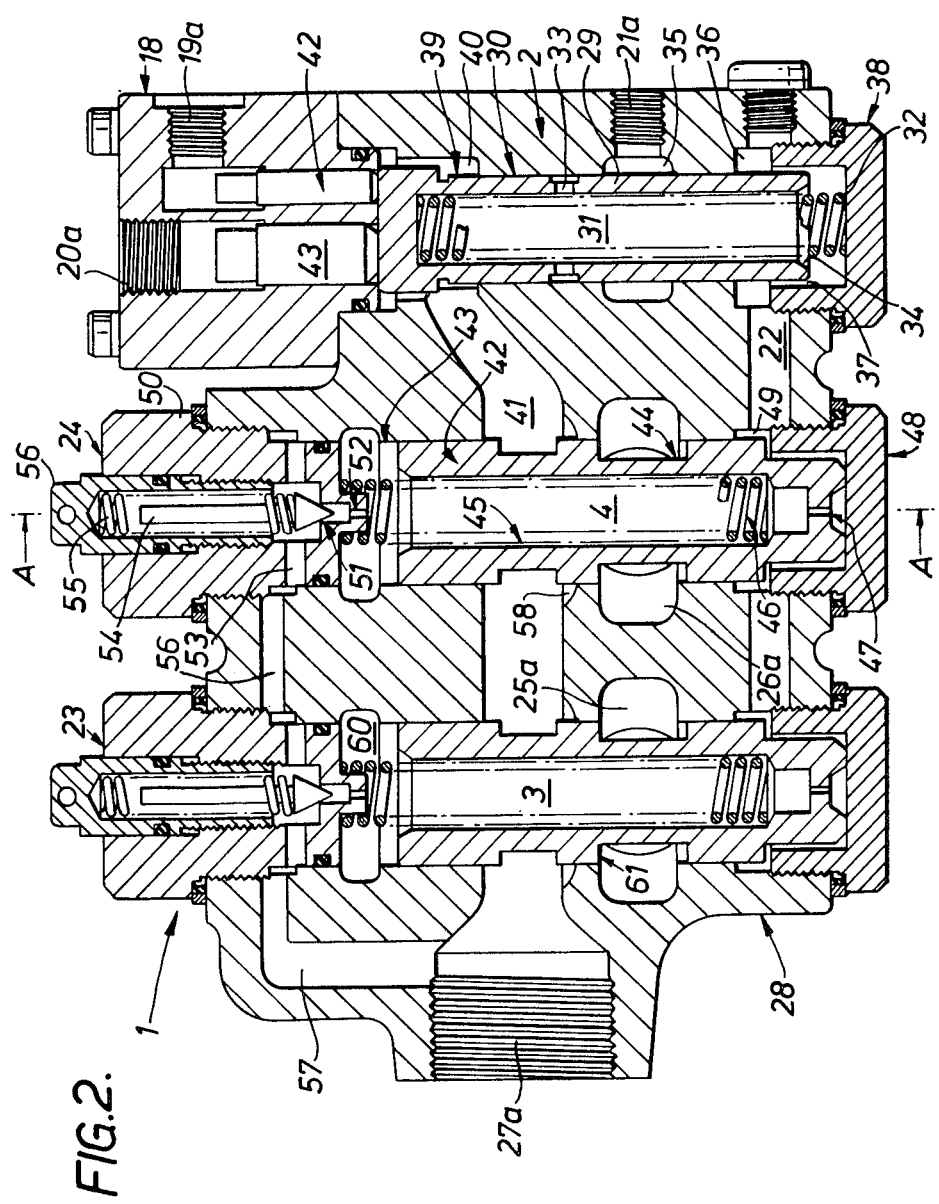
FIG. 2 shows an embodiment example of the summating and regulating unit for regulating two constant volume pumps.

An embodiment example of the regulator 1 is shown in FIG. 2 where the regulating units 3 and 4 and the summating unit 2 are built into a common housing 28. The summating unit contains a slide 29 which is displaceable in a bore 30 in the housing 28. A spring 32 is disposed in the slide 29 in a bore 31, said spring retaining the slide in neutral position in non-operational position. The slide bore 31 has an inlet gate 33 and an outlet gate 34. The pressure medium is supplied to the summating unit 2 through gate 21A to a bore 35 in the housing. The channel or conduit 22 is connected to the outlet 34 of the slide through bore 36 in the slide housing and bore 37 in a plug 38. The upper end of the slide 29 has an extension 39 which acts as a stopper against a recess 40 in the slide housing and serves to restrict the stroke length of the slide. The recess 40 is directly connected to return channel 41, so that any leakage is drained without pressure to the tank. In neutral position, the extension 39 of the slide bears against the summating head 18. The summating head 18 contains control pistons 42' and 43' and is supplied with pressure medium through gates 19A and 20A. The cross-sectional area of the control pistons is adapted to the volume capacity of the pump for each of the main circuits. In the described example, the cross-sectional area of the piston 42' corresponds to the volume capacity of the pumps PF2 and Pf4, and, in the same manner, the cross-sectional area of the control piston 43 corresponds to the volume capacity of the pumps PF1 and PF3.

Figure 3:
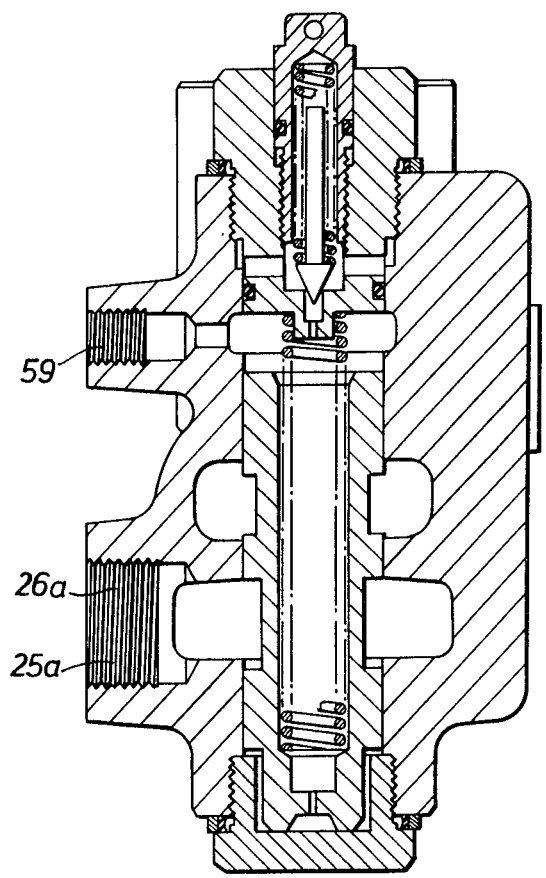
FIG. 3 is a section along the line A—A on FIG. 2.

Each of the regulating units 3 and 4 contains a slide 42 which is fitted into a bore 43 in the housing 28. A downwardly directed recess 44 in the regulating slide 42 is connected to the inlet gates 25A and 26A. The slide 42 is provided with an interior bore 45 wherein is disposed a spring 46 which retains the slide in lowest position in unoperational state. The slides 42 are provided at the lower end with a choke 47 which is in communication with channel 22 via the bore in plug 48 and recess 49 in the housing. The upper ends of the regulating slides 42 are connected to the pilot valves 23 and 24. The said pilot valves are of known, conventional embodiment, and consist of a housing 50 with seat 51, inlet 52 and outlet 53. The pilot valve further contains cone 54, spring 55 and adjustment screw 56. The outlet 53 of the pilot valves is connected to the return channel 41 via bores 56 and 57. The return channel 41 is in communication with outlet gate 27A. In order to achieve a smooth opening between the supply channels 25A, 26A and return channel 41 when the slide 42 switches over, choke grooves 58 are disposed in the valve housing. Normally it is the pilot valves 23 and 24 which determine the switching pressure for the slide 42, however, by means of connection 59 and recess 60 (FIG. 3), the switching pressure may also be regulated manually or in another manner if desired.

Figure 4:
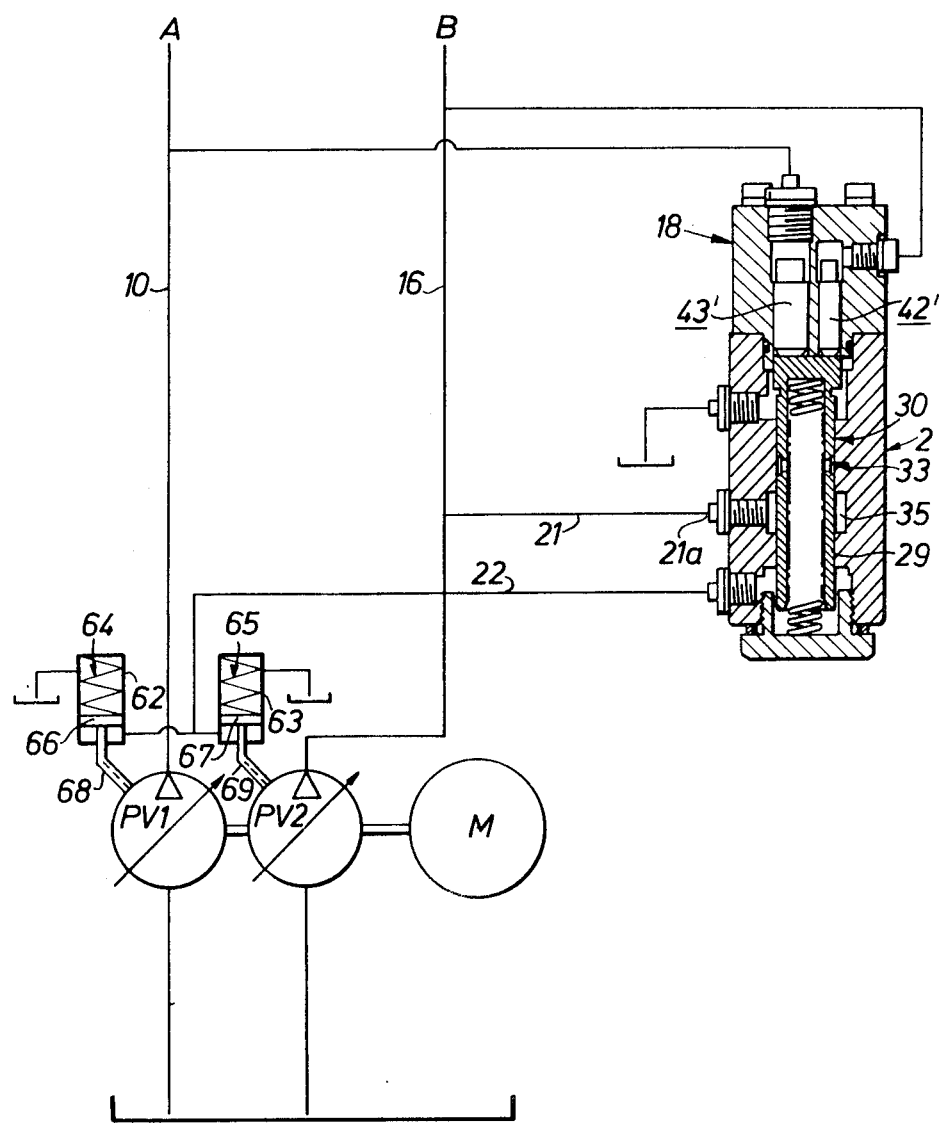
FIG. 4 shows a system with an effect regulator according to the invention for variable volume-flow pumps.

As previously mentioned, the invention may also be used to advantage for regulating the volume-flow from variable pumps, as illustrated in FIG. 4. The figure shows a two circuit system with two variable pumps PV1 and PV2, however, the invention is just as suitable for regulating one or more pumps. The volume-flow from a variable pump may, as is known, be varied by altering the angle of the inclined plate (thrust plate), so that the stroke length of the pistons increases or decreases. In the present invention the regulating member consists of a single-acting cylinder 62 and 63 for pumps PV1 and PV2 respectively. A spring 64, 65 retains a cylinder piston 66, 67 in neutral position. The cylinder piston is in direct communication with the inclined plate of the pump via the arm 68, 69.

When the consumers A and B are loaded (FIG. 1) a pressure arises in the main conduits 10 and 16. This pressure is transmitted via the conduits 19 and 20 to the summating head 18. The summating head 18 registers the total effect from all the pumps, and actuates the summating unit 2 so that pressure medium is supplied to conduit 22. The pressure in conduit 22 is proportional with the total effect from all the pumps, and will thus, at all times, regulate the effect to the consumers. If the load on the consumers is so great that the effect required is equal or in excess of the effect of the drive motor M, one of the regulating units 3 or 4 will switch over and disconnect one of the pumps PF1 or PF2. The regulating units 3 and 4 are adjusted so as to switch at a determined pressure in the conduit 22 by means of the pilots 23 and 24. It may be envisaged that the regulating unit 3 is adjusted to switch first. The pilot valve 23 is set so that the regulating unit 3 switches over at a pressure in the conduit 22 which corresponds to the maximum effect permitted from all the pumps PF1, PF2, PF3 and PF4. When the maximum effect is reached, the regulating units 3 switches over and the volume-flow from the pump PF1 flows via conduit 25 through the regulating unit 3 to the tank via the conduit 27. The pump PF1 then returns the medium to the tank, practically speaking without pressure. The single-way valve 11 prevents loss of pressure medium from the pump PF3.

Subsequent to this first step regulation, the effect from the drive motor M is reduced by a magnitude which corresponds to the volume-flow Q1 from the pump PF1 multiplied by the pressure to the consumer A. The load on the consumers A and B may now be increased further until the effect from the pumps PF2, PF3 and PF4 corresponds once more to the effect of the drive motor M. With an increased load on the consumers, the pressure will increase further in the main conduits 10 and 16. This pressure increase is registered by the summating head 18 and causes the pressure in conduit 22 to increase. The pilot valve 24 is adjusted so that the regulating unit 4 switches over when the pressure in conduit 22 corresponds to the maximum effect from the pumps PF2, PF3 and PF4. This maximum effect from is approximately equal to the performance possible from drive motor M. When the regulating unit 4 switches over, the medium flows from pump PF2 substantially without pressure to the tank through the return conduit 27.

Since it is now only pumps PF3 and PF4 which deliver pressure medium to the main conduits 10 and 16, the pressure to the consumers may be further increased. In this example, it is assumed that the effect for the pumps PF3 and PF4 will be less than the effect of the drive motor at the maximum working pressure in the system. Gradually, as the pressure requirement to the consumers decreases, the pressure is also reduced in conduit 22 and the regulating units 3 and 4 will thereby switch back to their original position. The pumps PF1 and PF2 are thereby again connected into the main circuit in reverse sequence to that of the disconnecting sequence.

When pressure medium is supplied through control conduits 19 and 20 to the control gates 19A and 20A, the control pistons 42' and 43' exert a force on the slide 29. When the pressure force from the control pistons 42' and 43' is in excess of the relatively weak spring force 32, this slide 29 moves downwardly until the slide bore 33 is in contact with bore 35. As previously mentioned, pressure medium is supplied from one or both main circuits via conduit 21 to inlet gate 21A. As the inlet gate 33 of the slide opens to the bore 35, the pressure medium flows in to the slide bore 31 and further through the outlet 34 of the slide bore to channel 22. A pressure is now built up in channel 22 and bores 36 and 37 and slide 29 are then actuated by a force on the lower end surface. Since the upper end 39 of the slide is drained to the tank through return channel 41, it is only the pressure forces from the pistons 42' and 43' which counteract the pressure force on the lower end of the slide. The pressure in channel 22 will therefore attempt to push the slide 29 against the control pistons 42' and 43' until the gate 33 is again closed. The pressure in channel 22 can therefore be only as great as determined by the pressure force on the control pistons 42' and 43'. The slide 29 is then in balance and moves only to supply pressure medium to inlet gate 33 if the pressure in channel 22 or the force on the pistons 42' and 43' is changed. The summating unit 2 operates in principle as a pressure reduction valve, therefore, where the reduced pressure in channel 22 is determined by the control pistons 42' and 43'. The summated pressure in channel 22 acts on the lowest end surface of the slides 42 in regulating units 3 and 4, and attempts to push these upwardly against the relatively weak spring 46. Immediately the slides 42 lift even slightly from the plug 48, pressure medium flows through choke 47 and bore 45 to the upper end of the slides. The summated pressure is transmitted further through bore 52 to pilot cone 54, and as long as the pilot cone closes against the seat 51, the pressure on both ends of the regulating slides 42 will be equal. The regulating slides 42 will thus remain in lower position as long as the pilot valves 23 and 24 are closed. When the summated pressure in channel 22 has reached a limit which is determined by the maximum effect of the drive motor, the pilot valve 23 opens and releases pressure medium to the tank via outlet 53 and channels 56 and 57. Gradually, as the pressure in channel 22 increases further, a flow takes place through choke 47 and further through pilot valve 23. The pressure in bore 60 will remain constant at the pressure to which the pilot valve 23 is adjusted, and will thus effect a constant force on the upper end surface of the slide 42. The choke 47 prevents the flow through the pilot valve 23 from affecting the summated pressure in channel 22. With a higher pressure in channel 22 than the pressure set on the pilot 23, the slide 42 for the regulating unit 3 will be in imbalance and is displaced upwardly. The recess 61 of the slide will therefore allow connection between the recess 25A and return channel 41, and thereby relieve the pump which is connected to the regulating unit 3. Choke groove 58 is disposed to allow a smooth relief of the pump.

As the pressure in the main conduit increases, the summated pressure channel 22 increases also. The slide in the regulating unit 3 is therefore switched over to upper position and allows free passage from gate 25A to the tank. At a determined higher pressure in channel 22, the pilot valve 24 opens so that a flow of pressure medium occurs through the choke 47 over the pilot valve to the tank. The pressure drop which occurs over the choke 47 will again cause an imbalance in the pressure forces on the end surfaces of the slide and cause this to be pushed upwardly. The gate or recess 26A thereby achieves communication with the return channel 41 and relieves the pump which is connected to the regulating unit 4. As will be apparent from the example illustrated, this is a two-step regulator, where a part of the volume-flow from the main circuits is disconnected as the load increases. It should further be apparent from the description that the regulator is not restricted to two steps, but can be developed to the number of regulation steps desired. The summating unit 2 can thus serve a plurality of regulating units.

When the regulator is adjusted to the maximum effect desired, it will function in an entirely automatic manner, and connect and disconnect the pump units as the load on the system is altered. In some cases, it can be expedient to amend the volume-flow in the main circuits even when the drive motor is not fully loaded. This can readily be carried out when using a regulator according to the present invention in that the regulator is provided with a connection 59 which leads to the recess 60 in the valve housing. The said gate can then, for example, be connected to a two-way valve which is normally closed but which, in operative state, allows communication between the connection 59 and the pressure-free tank. When the said valve is operated, the pressure will be zero at the upper end surface of the slide 4. The pressure in channel 22 then pushes the regulating slide completely over and permits full opening between the supply gate 25A or 26A and the return channel. This and other additional functions are not illustrated in the figures, since they are not of significance to the main invention.

When the regulating cylinder in FIG. 4 is in neutral position, the pump is adjusted to deliver maximum volume-flow. When pressure occurs in the control conduit 22, the force on the pressure side of the pistons 66, 67 increases. When this force is in excess of the spring force, the piston moves until there is balance between the spring force and the pressure force. This movement is transmitted via arm 68, 69 to the inclined plate of the pump and adjusts the angle thereof.

The regulating pressure of the cylinders 62 and 63 arises in the same manner as is described for FIGS. 1 and 2. The control pistons 42' and 43' also have cross-sectional areas which have the same proportion as the volume-flow of the pumps PV1 and PV2. As the consumers A and B are loaded, the pressure arising in the main conduits is transmitted to the control pistons 42' and 43' and cause a force against the slide 29. The bore 33 then opens to the bore 35 and releases pressure medium to the control conduit 22. The opening between the bore 35 and the bore 33 is of a size sufficient only to allow a correct pressure drop between the said bores, so that there is balance between the forces on both ends of the slide 29. The summated control pressure in conduit 22 is transmitted further to the regulating cylinders 62 and 63. The said cylinders are adapted so that, at the control pressure prevailing at all times in conduit 22, they will adjust the volume-flow from the pumps so that the total effect thereof corresponds to the effect of the drive motor. In this manner, a constant effect is obtained from a plurality of variable pumps driven by a common motor.

Figure 5:
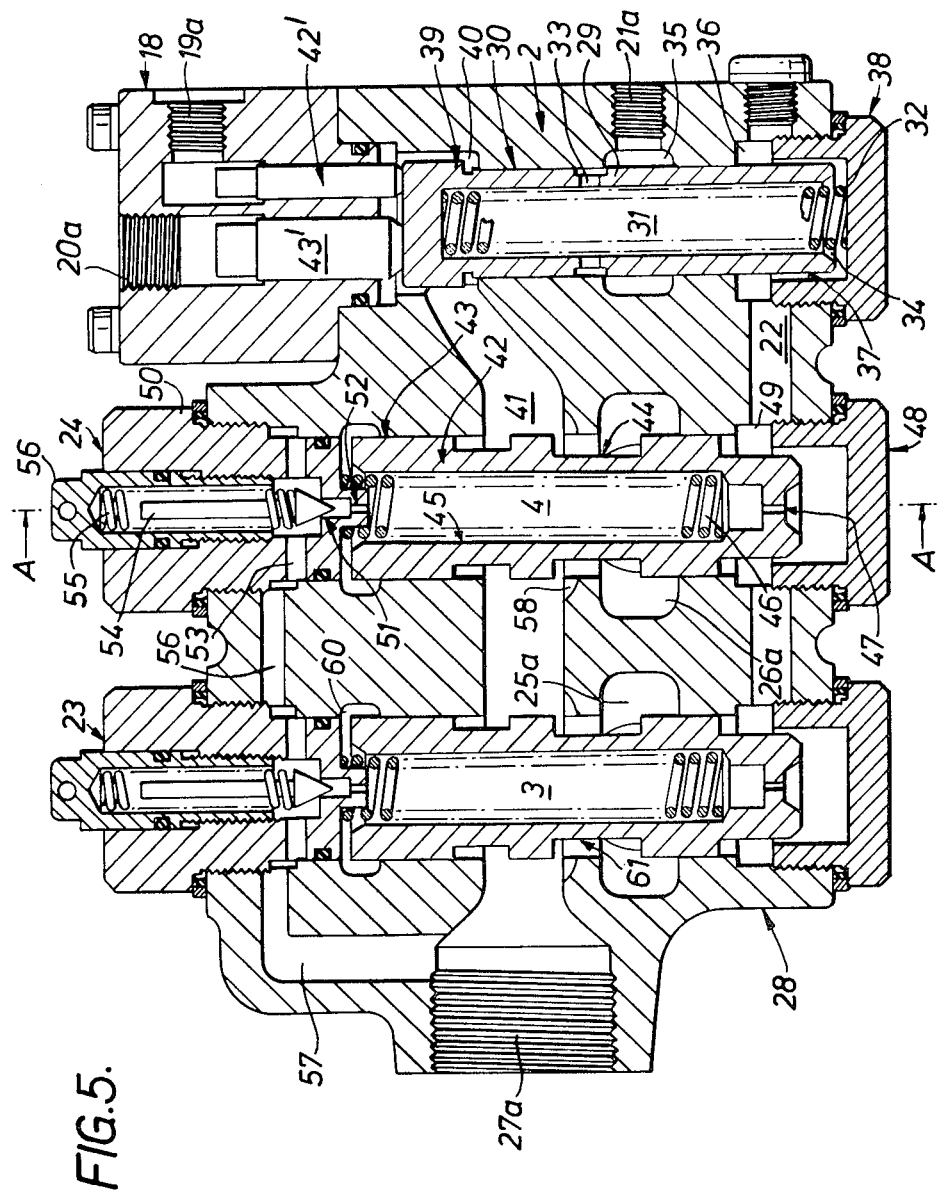
FIG. 5 is a view similar to FIG. 2, but with the components 3, 4, and 31 in condition for bypassing fluid.

FIG. 5 corresponds to FIG. 2 but illustrates the position of the components 3, 4, and 31 when fluid is bypassed.

The example described illustrates the manner in which the invention may be used for summating the effect from two variable pumps, it is obviously possible to summate the effect from more than two, however. Further, the invention can also be utilized to summate the effect from a plurality of separate volume-flow circuits to different consumers. The summating head 18 is then provided with a plurality of pistons, for example, a piston for each separate circuit, the said pistons having a relative size which corresponds to the relative proportion between the volume-flows in the circuits. The invention may thus readily be used for summating and regulating the effect from a plurality of separate volume-flow circuits which are supplied with volume-flow from respective pumps, and restrict the total effect so that the common drive motor is not overloaded.

Having described our invention, we claim:

1. Means for summating effect regulation of at least two pumps which are connected to one or more main circuits (6–10, 12–16), characterized in that each of the main conduits (8, 10, 14, 16) for the circuits (6–10, 12–16) is connected to control means (42', 43'), the said control means (42', 43') being adapted to exert a collective force on a valve means (29) which is adapted to supply pressure medium with a pressure which is a measure of sum of effect of the pumps (PF1, PF2, PF3, PF4), to a control conduit (22), the said pressure medium in the said control conduit (22) being adapted to actuate a further valve means (3, 4) which, when operated, connects a constant volume-flow pump (PF1, PF2) to a pressure-less tank.

2. Means according to claim 1, characterized in that it is adapted to decrease or increase the volume-flow from at least one variable pump (PV1, PV2).

3. Means according to claim 1, characterized in that the further valve means (3, 4) is adapted to be controlled by a pilot valve (23, 24).

4. Means according to claim 1, characterized in that the further valve means (3, 4) is capable of being controlled by a two-way means connected to a gate (59).

5. Means according to claim 1, characterized in that a one-way valve (11, 17) is disposed in a main conduit (9, 15) from the pump (PF1, PF2).

* * * * *